United States Patent Office
3,538,128
Patented Nov. 3, 1970

3,538,128
ANTHRAQUINONE DYES
Hans Rudolf Schwander, Riehen, Anton Zenhausern, Reinach, Basel-Land, and Peter Hindermann, Bottmingen, Basel-Land, Switzerland, assignors to J. R. Geigy A.G., Basel, Switzerland
No Drawing. Continuation-in-part of application Ser. No. 645,514, June 12, 1967, now Patent No. 3,499,915, which is a continuation-in-part of application Ser. No. 514,692, Dec. 17, 1965, now Patent No. 3,431,285. This application Mar. 28, 1968, Ser. No. 716,996
Claims priority, application Switzerland, Dec. 22, 1964, 16,533/64; Dec. 23, 1964, 16,633/64
Int. Cl. C09b 1/40
U.S. Cl. 260—372                                8 Claims

ABSTRACT OF THE DISCLOSURE 1,4-diamino-anthraquinone dyes which are substituted at the amino nitrogen in 1-position by a secondary alkyl or by a cycloalkyl group, and which are substituted at the amino nitrogen in 4-position by a mono-aralkyl substituent the aryl moiety of which is substituted by —$SO_3H$ and a fiber-reactive grouping especially of the —$CCl=CH_2$ or —$CH_2Cl$ type, which fiber-reactive grouping is linked to the said aryl moiety via a

—CO—NH—$CH_2$— type (Einhorn) bridge; these dyestuffs being useful as substantive, and as far as they possess fiber-reactive groupings, as reactive polyamide dyes.

RELATED APPLICATIONS

This application is a continuation-in-part application of our pending patent application Ser. No. 645,514, filed June 12, 1967, now U.S. Pat. 3,499,915, which is in turn a continuation-in-part of our pending patent application Ser. No. 514,692, filed Dec. 17, 1965, now U.S. Pat. 3,431,285.

DESCRIPTION OF THE INVENTION

The present invention concerns new fiber-reactive acid anthraquinone dyestuffs, processes for the production thereof, their use for the dyeing and printing of polyamide fibers as well as, as industrial product, the material dyed and printed therewith.

A great number of anthraquinone dyestuffs having very good fastness properties, particularly wet fastness properties, are known. But some of them are unsatisfactory in certain respects, for example, insufficient drawing power from a neutral bath, tendency to produce tippy dyeings, insufficient brilliancy, or they cannot be combined well with other dyestuffs of this class.

Thus, while certain blue anthraquinone dyestuffs described in the aforesaid application Ser. No. 645,514 can be mixed with yellow dyestuffs of other classes which dye polyamide fibers, especially nylon or wool, from an acid exhaustion bath, in order to obtain various green shades, it is not possible to use these anthraquinone dyes for dyeing of blended fiber materials containing the aforesaid polyamide fibers and another non-polyamide fiber component, if the latter component requires dyeing from a substantially neutral dyebath. They are also not suitable for the dyeing of the above-mentioned polyamide fibers or the afore-mentioned blended fibers when they are to be used in mixture with yellow dyes of other dyestuff classes, for the purpose of obtaining green shades, if these yellow dyes do not permit use of an acid exhaustion bath but draw only from a substantially neutral medium.

These requirements are fully met by dyestuffs according to the present invention. Moreover these new dyestuffs yield dyeings on the above-mentioned polyamide and blended fiber materials which are distinguished by specially outstanding wet fastness properties and brilliancy, especially including green shades obtained by mixture with neutral-drawing yellow dyes from other dyestuff classes.

Blended fiber materials contain besides the polyamide fibers, cellulosic fibers such as cotton, cellulose acetate including cellulose triacetate, polyethyleneglycol-terephthalate fiber or the like.

The new dyes according to the invention are distinguished apart from fulfilling the requirements explained in the foregoing, by excellent level drawing property on the above-mentioned polyamide blended fibers, and by satisfactory to very good light fastness of the resulting dyeings on these fibers, even in green shades obtained by using the above-mentioned mixtures of the new dyes with suitable neutral-drawing yellow dyes.

Yellow dyes which draw from a neutral bath on the above-mentioned fibers and are particularly suitable for mixture with the neutral-drawing anthraquinone dyes according to the invention are those of the following classes: benzene-azo-pyrazolone dyes, benzene-azo-iminopyrazole dyes, pyrazolone-azo-arylene-azo-pyrazolone dyes or imino-pyrazole-azo-arylene-azo-imino-pyrazole dyes.

A first class of these new dyestuffs falls under the Formula I:

$$\begin{array}{c}\text{O} \quad \text{NN-CH} \begin{array}{c} R_1 \\ R_2 \end{array} \\ \text{[anthraquinone]} \\ \text{O} \quad \text{NH-}[\text{CH-}R_4'\text{-}(SO_3H)_n\text{-}(CH_2\text{-N-CO-A})_m]\\ \quad\quad\quad\quad R_6' \quad\quad\quad\quad\quad\quad R_7 \end{array} \quad (I)$$

and a second class under the Formula II:

$$\begin{array}{c}\text{O} \quad \text{NH-cycloalkyl} \\ \text{[anthraquinone]} \\ \text{O} \quad \text{NH-}[\text{CH-}R_4'\text{-}(SO_3H)_n\text{-}(CH_2\text{-N-CO-A})_m]\\ \quad\quad\quad\quad R_6' \quad\quad\quad\quad\quad\quad R_7 \end{array} \quad (II)$$

wherein:

each of $R_1$ and $R_2$ represents a lower alkyl group, $R_4'$ represents a divalent aralkylene group linked with its alkyl moiety to

—CH— and with its arylene moiety to the —$SO_3H$ group, and being unsubstituted or ring-substituted by lower alkyl and/or lower alkoxy groups and/or by halogen, $R'_6$ is an alkyl, cycloalkyl or aralkyl radical, the latter being linked by its alkyl moiety to the

—CH— group in said formulas and being unsubstituted or ring substituted by lower alkyl and/or lower alkoxy groups and/or by halogen, $R'_7$ represents hydrogen or lower alkyl, "cycloalkyl" means preferably the unsubstituted cyclopentyl or cyclohexyl group or a lower alkyl-substituted cyclopentyl or cyclohexyl group, A represents an alkenyl group which can optionally contain at least one substituent which can be split off as ion, and which can be substituted, e.g. by phenyl and/or halogen, or it represents an alkyl group which contains at least one substituent which can be split off as ion and which can be substituted, e.g. by phenyl and/or halogen, and $m$ represents 1 or 2 and $n$ is a number ranging from 1 to 2.

More in detail, in prefered subclasses of the dyestuffs falling under Formulas I and II, $R'_6$ represents the same alkyl or cycloalkyl radical as represented by $R_6$ in Formula V, infra, or when $R_6$ represents aralakyl, the corresponding mono- or polyvalent aralkyl group, the radicals $R'_4$ and $R'_6$ together having a total of at least three and not more than five free bonds, and the number of aryl moieties in $R'_4$ and $R'_6$ counted together being preferably not more than two, and preferably one, $R'_4$ represents a mono- or polyvalent aralkyl radical preferably with one mononuclear carbocyclic, aryl moiety, which corresponds to the radicala $R_4$ in Formula V, infra, and the groupings —SO₃H and $$-CH_2-\underset{R_7}{N}CO$$

are each bonded to carbon atoms of the aryl nuclei in the arylkyl moieties $R'_4$ and/or $R'_6$.

The acid anthraquinone dyestuffs according to the invention are suitable for the dyeing and printing of synthetic polyamide fibers, primarily nylon, e.g. nylon 6 or nylon 66, or polyurethanes or, secondarily of natural polyamide such as silk, leather and, particularly, wool. They draw onto these fibers from a weakly acid to acid bath at higher temperature evenly and cover barriness of nylon very well. Compounds according to the invention of Formulas I and II which contain two radicals $$-CH_2-N(R_7)-CO-A$$

are advantageously dyed from a weakly acid bath in the presence of a dyeing auxiliary such as an addition product of about 5–20 mols of ethylene oxide to a fatty acid alkanolamide. Compounds of Formulas I and II which contain only one radical $-CH_2N(R_7)-CO-A$ have particularly high drawing power from a neutral bath.

The blue dyeings obtained, particularly the wool dyeings, are distinguished by high brilliancy as well as by fastness to rubbing, good light fastness and good wet fastnes properties, particularly fastness to washing, milling and sea water. In addition, the dyestuffs according to the invention are suitable for use in admixture with other acid dyestuffs to attain combination dyeings.

In some cases the new dyestuffs according to the invention can be used for the dyeing of cellulose material, particularly cotton. Dyeing of this material is performed by the methods usual for reactive dyestuffs.

Particularly preferred among the dyestuffs of Formulas I and II, on account of an optimal combination of the valuable dyeing p roperties outlined hereinbefore, are the dyestuffs of the Formula III:

(III)

wherein:

Q' represents one of the radicals $$-C\underset{R_2}{\overset{R_1}{\diagup}}H$$

cyclopentyl or cyclohexyl, each of $R_1$ and $R_2$ represents lower alkyl, $R'_3$ represents alkyl of from 1 to 2 carbon atoms, $R_5$ represents alkylene of from 1 to 2 carbon atoms, $Z_1$ represents hydrogen, methyl, methoxy, chlorine or bromine, $Z_2$ represents hydrogen, methyl or methoxy, and $A_1$ represents lower alkyl of from 1 to 4 carbon atoms or lower alkenyl of 2 to 3 carbon atoms, each of which is substituted by from one to two halogen atoms selected from chlorine and bromine.

Another preferred subclass of dyestuffs according to the invention comprises the dyestuff of the Formula IIIa:

(IIIa)

wherein:

Q' represents one of the radicals $$-C\underset{R_2}{\overset{R_1}{\diagup}}H$$

cyclopentyl or cyclohexyl, each of $R_1$ and $R_2$ represents lower alkyl, $R'_3$ represents alkyl of from 1 to 2 carbon atoms, $R_5$ represents alkylene of from 1 to 2 carbon atoms, $Z_1$ represents hydrogen, methyl, methoxy, chlorine or bromine, $Z_2$ represents hydrogen, methyl or methoxy, and $A_1'$ represents an alkenyl radical of from 2 to 4 carbon atoms, especially the —CH=CH₂ or $$-\underset{CH_3}{\overset{}{C}}=CH_2$$

group.

The drawing power on nylon of the dyestuffs according to the invention, and particularly of thse falling under Formulas III and IIIa is particularly superior to that of the corresponding dyestuffs in which ring B is directly linked to the amino group in 4-position at the anthraquinone nucleus. The same applies to fastness of nylon dyeings obtained with the novel dyestuffs to rubbing and to milling.

Dyestuffs falling under Formulas III and IIIa in which Q' represents the grouping $$-C\underset{R_2}{\overset{R_1}{\diagup}}H$$

and particularly isopropyl, are particularly superior to the corespondingly substituted last-mentioned known dyestuffs in that their dyeings on synthetic polyamide fibers, and especially on texturized nylon (e.g. Banlon) show superior fastness to rubbing, and their dyeings on staple rayon are particularly superior in fastness to perspiration, especially alkaline perspiration.

Dyestuffs falling under Formulas III and IIIa in which Q' represents a cycloalkyl radical and especially cyclohexyl are superior to the correspondingly substituted last-mentioned known dyestuffs in that their dyeing on the above-mentioned polyamide fibers, especially on texturized nylon are faster to rubbing and show a better coverage of barriness.

The unsulfonated dyestuffs according to the invention and particularly those corresponding to Formulas III and IIIa but being free from sulfonic acid groups, are useful as disperse dyestuffs for the dyeing of polyamide fibers; the dyeings show good wet fastness properties.

The dyestuffs according to the invention, which fall under Formulas I and II, are produced by reacting an anthraquinone compound of the Formula IV:

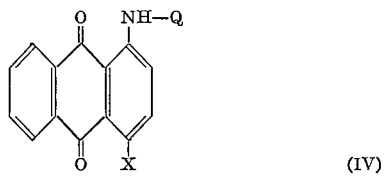

(IV)

wherein:
Q represents a secondary alkyl or a cycloalkyl group and
X represents a substituent which can be exchanged for an aralkylamino group, for example chlorine, bromine, the hydroxyl or a lower alkoxy group, such as the methoxy group, or the nitro or amino group, chlorine or bromine being preferred, with an aralkylamine containing at least two replaceable hydrogen atoms in the nucleus of the Formula V:

(V)

wherein:
$R_4$ represents an aralkyl group optionally ring-substituted by lower alkyl or lower alkoxy groups or by halogen, and
$R_6$ represents an alkyl group, a cycloalkyl group or an aralkyl group optionally ring-substituted by lower alkyl and/or lower alkoxy groups and/or by halogen, to form the corresponding 1-sec. alkylamino- or 1-cycloalkylamino - 4-aralkylamino-anthraquinone and, in any order desired, reacting the latter with $n$ mol of a sulfonating agent and with $m$ mol of a compound introducing the radical of the Formula VI

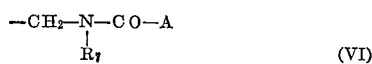

(VI)

wherein:
$R_7$ represents hydrogen or a lower alkyl group and
A has the same meaning as in Formulas I and II, to form an anthraquinone dyestuff of the average composition as defined in Formula I or II, respectively.

If Q is a secondary alkyl group then this advantageously contains at most 6 carbon atoms and is, e.g. the isopropyl, sec. butyl or sec. isoamyl group. When Q is a cycloalkyl group it is preferably a mononuclear group such as the cyclopentyl or cyclohexyl group or homologues thereof, or it is a polynuclear non-condensed cycloalkyl group such as a dodecahydrodiphenyl group or a polynuclear condensed group such as decahydronaphthyl-(1)- or (2)-group.

Advantageously Q represents the isopropyl, sec. butyl or cyclohexyl group.

Aralkyl groups in the position of $R_4$ and $R_6$ are above all α-arylalkyl or β-arylalkyl groups, the aryl ring preferably being mononuclear. Examples thereof are the benzyl or phenethyl group. The aralkyl radicals in the positions of $R_4$ and $R_6$ can also contain two benzene nuclei. In this case they are, e.g. radicals of a β,β-diphenylethane. If the aryl rings of the aralkyl groups are substituted by low alkyl or alkoxy groups then these groups advantageously are, for instance, the methyl or ethyl group and the methoxy or ethoxy group, respectively; if they are substituted by halogen then this is for example fluorine, bromine or especially chlorine. The aliphatic part of the aralkyl radical can be straight or branched chained.

As alkyl group, $R_6$ is for example the methyl, ethyl or isobutyl group. When $R_6$ is a cycloalkyl group, it is preferably the cyclohexyl group.

In preferred aralkylamines of Formula V, $R_4$ is a phenylalkyl radical, especially the benzyl or phenethyl radical, and $R_6$ is a low alkyl group, preferably the methyl group.

X in Formula IV represents, e.g. chlorine, bromine, the hydroxyl group, low alkoxy groups such as the methoxy group, or the nitro or amino group. However, X is preferably chlorine or bromine.

If $R_7$ is a low alkyl group then it is advantageously a methyl or ethyl group; more preferably, however, $R_7$ is hydrogen.

When A is an alkenyl group, it has at most 4, but advantageously 2 or 3 carbon atoms and not more than one double bond and is, e.g. a vinyl, propenyl, isopropenyl, 1-methylpropenyl, allyl or methallyl radical. If A is an alkyl group then it preferably contains 1 to 4 carbon atoms.

The substituents which can be split off as ion may be split off as anion or cation. Examples of the former are halogens such as chlorine or bromine, an alcoholic hydroxyl group esterified with sulphuric acid or with aliphatic or aromatic sulphonic acid, or the groups R—O—, R—S— and R—SO$_2$—, wherein R is an organic radical such as an aliphatic or aromatic hydrocarbon radical. Examples of groups which can be split off as cation are quaternary ammonium groups such as the trimethyl ammonium group, the group

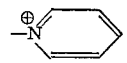

or

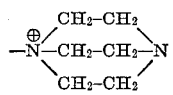

Preferably A contains a halogen atom in the α-position to the —CO— group and it is for example the chloromethyl, bromomethyl, α-chlorovinyl or α-bromovinyl group.

There can be one or more groups present in the radical A which can be split off as anion or cation.

When the alkyl groups are further substituted and the alkenyl groups are substituted or further substituted, they contain, e.g. a hydroxyl, carboxyl or aryl group, in the latter case preferably the phenyl group.

Examples of A are:

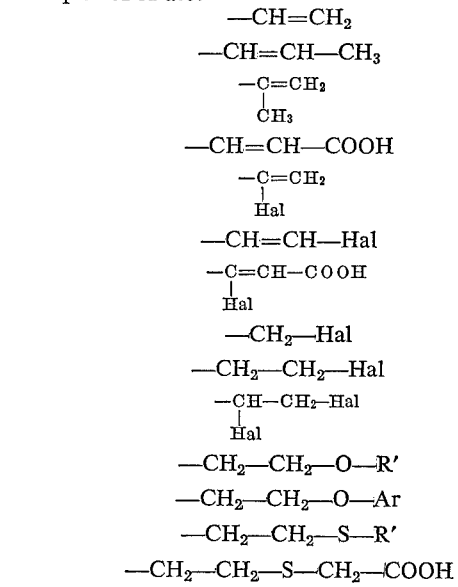

—CH₂—CH₂—S—Ar

—CH₂—CH₂—O—SO₃H

—CH₂—CH₂—O—SO₂—Ar

—CH—CH₂—O—SO₃H
   |
   Hal

—CH₂—CH₂—SO₂—Ar

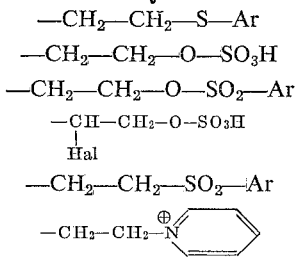

In the above, Hal represents chlorine or bromine, R' represents an alkyl group and Ar an aryl group.

In preferred compounds introducing the radical of Formula VI, A is the chloromethyl or the α-chlorovinyl group and R₇ is hydrogen.

Starting materials of Formula IV are obtained by known processes, e.g. by chlorinating or brominating or nitrating the corresponding 1-sec. alkylamino- or 1-cycloalkylamino- anthraquinone compounds and, if desired, exchanging the chlorine or bromine for the hydroxyl or a low alkoxy group, or reducing the nitro group to the amino group. Starting compounds of Formula IV wherein X is the hydroxyl group can also be obtained by reacting 1,4-dihydroxyanthraquinone or its leuco compound or a mixture thereof with the corresponding sec. alkylamine or cycloalkylamine. They can be used direct for reaction with the aralkylamine of Formula V without isolation.

The aralkylamines of Formula V are obtained, according to R. Leuckart, Ber. 18, 2341 (1885) for example, by reacting ketones of the formula

with ammonium formate or formamide and then splitting off the formyl group. In some cases, they can be obtained according to G. Mignonac C.r. 172, 223 (1921) by converting an arylidene ketone into the saturated amine with ammonia and hydrogen in the presence of a catalyst.

Examples of compounds which can be used to introduce the radical of Formula VI are the N-methylolamides or N-(chloromethyl)- or N-(bromomethyl)-amides of corresponding carboxylic acids of the formula:

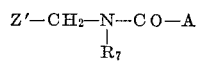

wherein Z' represents the hydroxyl group or chlorine or bromine.

The N-methylolamides are obtained, e.g. by adding formaldehyde to the corresponding carboxylic acid amines in the presence of basic condensing agents such as potassium carbonate, or also by reaction with mineral acid under mild conditions, and the N-(chloromethyl)- or N-(bromomethyl)-amides are obtained by reacting the methylolamides mentioned above with, e.g. thionyl chloride or thionyl bromide. Instead of the N-methylolamides or N-(halogenomethyl)-amides, also other reactive functional derivatives which react in the same way can be used, e.g. other esters of the methylol compounds with inorganic acids. Also the di-(carboxylic acid amidoethyl)-ethers obtained by condensation of the methylolamides in the presence of, e.g. phosphorus oxychloride, can be used. However, as these functional derivatives often have to be produced from the corresponding methylol compounds, the latter are preferred.

The reaction of the anthraquinone compound of Formula IV with the aralkylamine of Formula V is peformed, e.g. in solution or in the melt of an excess of aralkylamine as defined or in an organic solvent not taking part in the reaction. Preferable solvents for this purpose are, e.g. aromatic hydrocarbons such as toluene, xylenes or naphthalene; or halogenated or nitrated aromatic hydrocarbons such as chlorobenzene, di- and tri-chlorobenzene or nitrobenzene; or halogenated aliphatic hydrocarbons such as trichloroethylene; alcohols, e.g. alkanols such as n-butanol, sec. butanol or alkylene glycol monoalkyl ethers e.g. ethylene glycol monomethyl or monoethyl ether; aromatic hydroxyl compounds, e.g. phenol and its homologues; or tertiary nitrogen bases such as pyridine.

If, as starting material, an anthraquinone compound of Formula IV is used wherein X is halogen, especially chlorine or bromine, the reaction is advantageously performed in the presence of copper or a copper compound such as cuprous chloride and in the presence of an acid buffering agent and, preferably at a raised temperature.

As acid buffering agent, advantageously an excess of the aralkylamine as defined is used, optionally together with an alkali metal salt of a fatty acid such as sodium or potassium acetate or of carbonic acid, such as sodium bicarbonate or sodium carbonate, or with an alkali metal hydroxide such as sodium or potassium hydroxide, or with magnesium oxide. In some cases, a tertiary amine such as triisopropanol-amine can be used as buffering agent.

The reaction of the 1-sec. alkylamino- or 1-cycloalkylamino - 4 - aralkylamino-anthraquinone compound with the compound introducing the radical of Formula VI is performed advantageously in the presence of acid condensing agents or agents splitting off water which react as such condensing agents. Examples of such condensing agents are concentrated hydrochloric acid, zinc chloride, phosphorus pentoxide, acetic acid anhydride, syrupy phosphoric acid and oleum. The preferred condensing agent, however, is 90% to anhydrous sulphuric acid. The reaction temperature can fluctuate within wide limits and depends mainly on the condensing agent used. In concentrated sulphuric acid, the reaction generally proceeds quickly and completely even at room temperature; in some cases a slightly raised temperature is necessary. The finished reaction products are precipitated, for instance, by pouring the sulphuric acid solutions or suspensions into ice water and they are converted into the water soluble alkali metal salts in the usual way and these are isolated.

In some cases, instead of the aforesaid N-methylolamides or N-halogenomethylamides a mixture of α,α'-dichloro- or α,α'-dibromo-dimethyl ether with the corresponding carboxylic acid amides or with carboxylic acid nitriles, such as acrylonitrile or a halogen acrylonitrile can be used as compounds introducing the radical of Formula VI. In this case too, the reaction is advantageously performed in concentrated sulphuric acid. (This method of performing the process according to the invention is described, for example, in the following Belgian Pats.: 630,205; 625,916; 628,442; 608,932; 613,037; 603,420; 612,417.)

The sulphonation is performed by usual methods, for instance, in concentrated sulphuric acid or in oleum under mild conditions, e.g. at room temperature, or with chlorosulphonic acid in a solvent which is inert under the reaction conditions.

In a preferred method, sulfonation is carried out with oleum having an SO₃-content of at least 3% but not more than about 10% by weight, preferably, however about 6 to 7%, at room temperature (15 to 35° C.). The degree of sulfonation attained is controlled by testing the solubility of samples or other known methods which have been mentioned under the first aspect of the invention.

Isolation and identification of isomers constituting the dyestuffs of the invention could be achieved by the methods described under the first aspect of the invention, but they are of no practical value for the same reasons as stated thereunder.

A technically particularly simple and, therefore, preferred method consists in the condensation of the 1-sec. alkylamino- or 1-cycloalkylamino-4-aralkylamino-anthraquinone compound with the compound introducing the radical of Formula VI or precursors thereof and sulfonation of the condensation product obtained without isolation of the intermediate product. This condensation is performed in concentrated sulfuric acid whereupon the condensation product obtained is sulfonated in sulfuric acid solution.

The two operations last mentioned are advantageously so arranged that not more than one radical of Formula V and one sulfonic acid group are introduced per aralkyl radical having at least two replaceable hydrogen atoms in the nucleus.

A first modification of the process according to this aspect of the invention consists in reacting an anthraquinone compound of Formula VII:

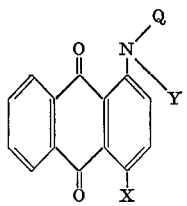

wherein Y represents an acyl radical and Q and X have the meanings given above, with an aralkylamine, having at least two replaceable hydrogen atoms in the nucleus, of Formula V to form the corresponding 1-(N-sec. alkyl-N-acylamino)- or 1-(N-cycloalkyl-N-acylamino)-4-aralkylamino-anthraquinone compound and, in any order desired, saponifying this into the corresponding 1-sec. alkylamino- or 1-cycloalkylamino-4-aralkylamino-anthraquinone compound and reacting with $n$ mol of a sulfonating agent and $m$ mol of a compound introducing the radical of Formula VI to form an anthraquinone dyestuff mixture of the average composition of Formula I or II, respectively.

Y represents, e.g. a carbacyl radical, particularly an alkanoyl radical, e.g. the formyl, acetyl or propionyl radical, or an aroyl radical such as the benzoyl radical, or an alkylsulfonyl radical such as the methylsulfonyl radical, or an arylsulfonyl radical such as the phenylsulfonyl or p-methylphenyl sulfonyl radical. Preferably Y is the acetyl radical.

The 1-acylamino-anthraquinones of Formula VII are obtained by known methods, e.g. by reacting an anthraquinone compound of Formula IV with an acylating agent introducing the radical Y, mainly with acetyl chloride or bromide or acetoanhydride.

The reaction of the 1-acylamino-anthraquinone compound of Formula VII with the aralkylamine of Formula V is performed as described in the first process. Preferably, the 1-(N-sec. alkyl-N-acylamino)- or 1-(N-cycloalkyl-N-acylamino)-4-aralkylamino-anthraquinone compound is first saponified, then reacted with the compound introducing the radical of Formula VI and finally sulfonated. Saponification is performed advantageously in aqueous acid medium, e.g. in aqueous sulfuric acid and, advantageously, at a raised temperature. The reaction with the compound introducing the radical of Formula VI and the sulfonation are performed as described in the first process of the invention.

The quantitative reaction of an acylamino-anthraquinone compound of Formula VII with an aralkylamine of Formula V and the subsequent quantitative saponification of the acyl radical are unexpected, as normally when arylamines are used instead of aralkylamines, insufficient yields are obtained on splitting off the acyl radical.

A second modification of the process according to the invention consists in reacting an anthraquinone compound having in the aryl moiety of

preferably of $R_4$, at least two exchangeable hydrogen atoms, of Formula VIII:

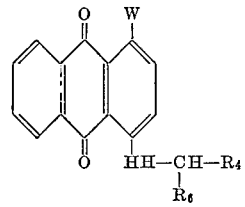

wherein W represents a substituent which can be exchanged for a (sec. alkyl)-amino or cycloalkylamino group and $R_4$ and $R_6$ have the meanings given in Formula V, with a (sec. alkyl)-amine or a cycloalkylamine of Formula IX:

$$Q-NH_2 \qquad (IX)$$

wherein Q has the meaning given in Formula VIII, to form the corresponding 1-sec. alkylamino- or 1-cycloalkylamino 4-aralkylamino-anthraquinone compound and, in any order desired, reacting this with $n$ mol of a sulphonating agent and $m$ mol of a compound introducing the radical of Formula VI to form an anthraquinone dyestuff mixture of the average composition of Formula I or II, respectively.

W represents, like X in the first process, e.g. the hydroxyl or a low alkoxy group such as the methoxy group or the amino or nitro group, or especially chlorine or bromine.

The starting materials of Formula VIII are known or can be produced by known methods, e.g. by reacting a 1-chloro- or 1-bromo- or 1-nitro- 4-low-alkoxy-anthraquinone with an aralkylamine of Formula V, and, if desired, converting the chlorine or bromine into a low alkoxy group or reducing the nitro group to the amino group.

Starting compounds wherein W is the hydroxyl group can be produced by reacting 1,4-dihydroxy-anthraquinone or its leuco compound or a mixture thereof with an aralkylamine of Formula V. They can be used direct without isolation for the condensation with the (sec. alkyl)-amine or cycloalkylamine of Formula IX.

The reaction of the compound of Formula VIII with the (sec. alkyl)-amine or cycloalkylamine of Formula IX to form the corresponding 1-sec. alkylamino- or 1-cycloalkylamino-4-aralkylamino-anthraquinone and the condensation of the latter with the compound introducing the radical of Formula VI and the sulphonation to form the end product of Formula I or II are performed analogously to the descriptions given in the first process of this aspect of the invention.

A third modification of the process according to this aspect consists in reacting an anthraquinone compound containing in the aryl moiety of

preferably of $R_4$, at least two exchangeable hydrogen atoms, of Formula X:

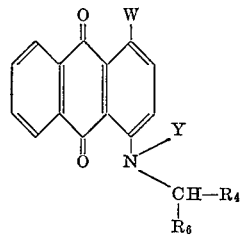

wherein Y has the meaning given in Formula VII, W has that given in Formula VIII and $R_4$ and $R_6$ have the meanings given in Formula V with a (sec. alkyl)-amine or a cycloalkylamine of Formula IX to form the corresponding 1-sec. alkylamino- or 1-cycloalkyl-amino-4-(N-aralkyl-N-acylamino)-anthraquinone compound and, in any order desired, saponifying and reacting this with $n$ mol of a sulfonating agent and $m$ mol of a compound introducing the radical of Formula VI to form an anthraquinone dyestuff mixture of the average composition of Formula I or II, respectively.

The starting materials of Formula X are obtained by known methods, e.g. by reacting an anthraquinone compound of Formula VIII with an acylating agent introducing the radical Y, preferably with acetyl chloride or bromide or with acetoanhydride.

The reaction of the acylamino-anthraquinone compound of Formula X with the (sec. alkyl)-amine or cycloalkylamine of Formula IX and the saponification of the 1-sec. alkylamino- or 1-cycloalkylamino-4-(N-aralkyl-N-acylamino)-anthraquinone compound as well as the sulfonation and reaction with the compound introducing the radical of Formula VI are performed as described in the first process of the invention.

The end products of Formulas I and II are isolated preferably in the form of alkali metal salts, more preferably as sodium salts. They are very soluble in water.

The dyestuffs according to the invention are mixtures of all the isomers falling under their respective formulas, with a few exceptions where such formula represents only individual compounds.

While it is possible to isolate the individual isomers constituting these mixed dyestuffs by known chromatographic techniques, and to identify the position of fiber-reactive or non-fiber-reactive Einhorn groups and sulfonic acid group or groups in all three aspects, in each isomer, from their magneto-nuclear resonance spectra, such further workup will not lead to products of improved properties, and is, moreover, highly uneconomical, so that it is of no practical value.

The following non-limitative examples illustrate the invention. The temperatures are given therein in degrees centigrade. Where not otherwise stated, parts and percentages are given by weight.

EXAMPLE 1

(I)(a)(1) A mixture of 19 g. of 1-cyclohexylamino-4-bromoanthraquinone, 19 g. of 1-phenyl-3-aminobutane, 5 g. of anhydrous potassium acetate, 0.005 g. of cuprous chloride, 10 ml. of n-butanol and 0.10 ml. of water is stirred for 48 hours at a temperature of 100°. 30 ml. of methanol are then added to the reaction mixture through a dropping funnel after which the temperature is kept for 30 minutes at 50° whereupon 50 ml. of isopropanol are also added to the reaction mixture. After cooling to room temperature, the precipitated product is filtered off and purified by recrystallization from n-butanol whereupon the compound of the formula:

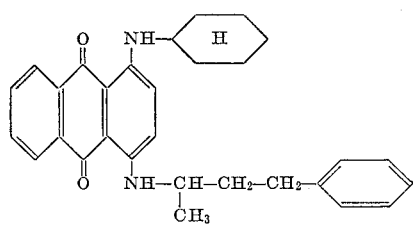

is obtained, M.P. 145°.

If instead of 1-cyclohexylamino-4-bromoanthraquinone, equivalent amounts of the 1-cycloalkylamino-4-halogenoanthraquinones given in the following Table 1 are used (produced by halogenating the corresponding 1 - cycloalkylaminoanthraquinones with bromine in glacial acetic acid or with sulphuryl chloride in nitrobenzene), then with otherwise the same procedure, similar end products are obtained.

TABLE 1

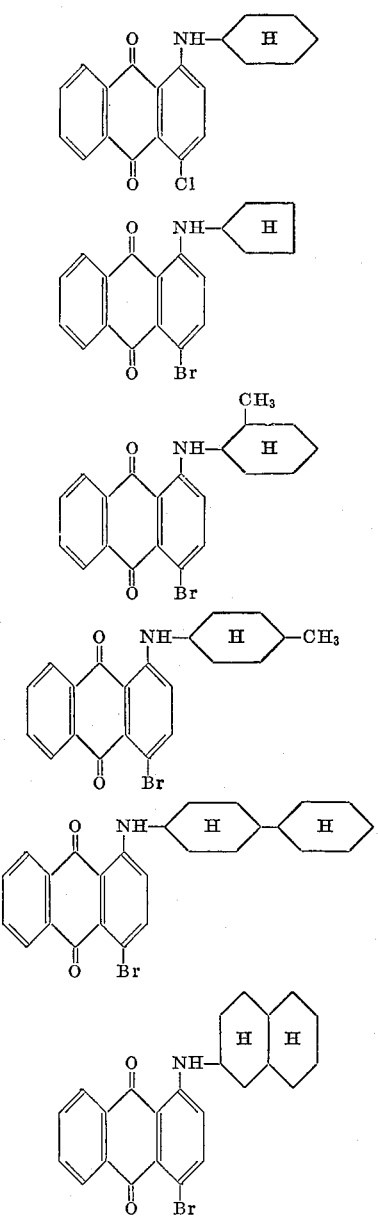

Other similar products are obtained if in the above Example 1(a) instead of 1-phenyl-3-aminobutane, equivalent amounts of the aralkylamines given in the following Table 2 are used and otherwise the procedure is the same as given in Example 1(a).

TABLE 2

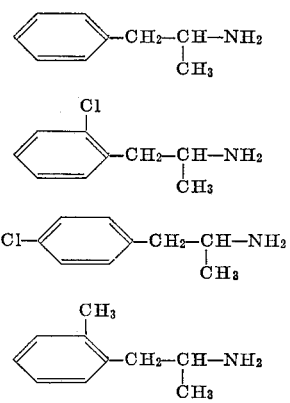

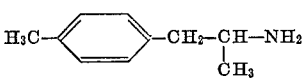

(41) 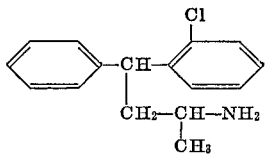

(42) 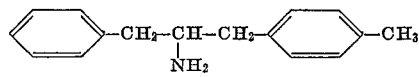

(43) 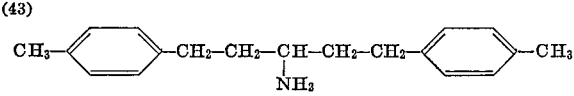

(44) 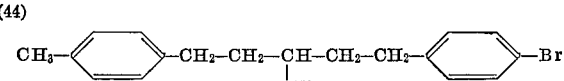

(45) 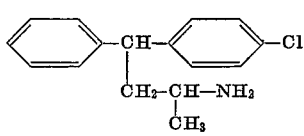

(46) 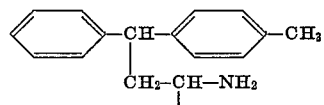

(II) 45.2 g. of the compound of the formula

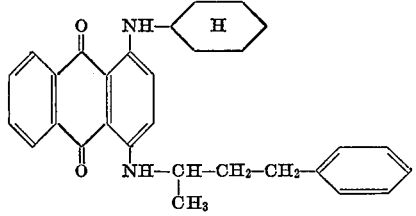

are added in portions to 13.7 g. of N-methylol chloracetamide until a homogeneous mixture is attained, the mixture is added to 500 g. of 90% sulphuric acid at a temperature of 5–10° and the solution obtained is stirred for 24 hours at this temperature. The mixture is then poured onto ice, the precipitated condensation product is filtered off, washed neutral with water and dried at 60° in vacuo. It is sulphonated by adding the product to 10 times its amount by weight, of 6% oleum at 23–25° and stirring the mixture for 18 hours. The solution is then poured onto ice, the precipitated dyestuff is filtered off and washed with aqueous 10% sodium chloride solution. The precipitate is slurried in water and the pH of the slurry is adjusted to 7 by the careful addition of dilute sodium hydroxide solution. The dyestuff is then precipitated by the addition of sodium chloride and is filtered off and dried at 60° in vacuo. The dyestuff is obtained as a blue powder which dissolves easily in water with a blue color.

The dyestuff dyes nylon and wool from a neutral to weakly acid bath in very brilliant blue shades. The dyeings are very level and have good fastness to light and excellent wet fastness.

If instead of the 1-cyclohexylamino-4-aralkylamino-anthraquinone compound of the above formula, an equivalent amount is used of one of the anthraquinone compounds given above, which is obtained (according to Example 1(a)) by reacting each of the 1-cycloalkylamino-4-halogeno-anthraquinones listed in Table 1 with 1-phenyl-3-amino-butane or each of the aralkylamines which are listed in Table 2, and otherwise the procedure given in Example 1(II) is followed, then dyestuffs having similar good dyeing properties are obtained.

Dyestuffs having similar valuable properties are also obtained if, in each of the examples described above, instead of the 13.7 parts of N-methylol chloracetamide, an equivalent amount of the N-methylol compound of one of the amides given in the following Table 3 is used.

TABLE 3

(α) Br—CH$_2$—CONH$_2$
(β) Cl—CH$_2$—CO—NH—CH$_3$
(γ) Br—CH$_2$—CO—NH—C$_2$H$_5$
(δ) Cl—CH$_2$—CH(Cl)—CONH$_2$
(ε) Cl—CH$_2$—CH$_2$—CONH$_2$
(ζ) Br—CH$_2$—CH$_2$—CONH$_2$
(η) H$_2$C=C(Cl)—CONH$_2$
(θ) H$_2$C—C(Br)—CONH$_2$
(ι) Cl—CH=CH—CONH$_2$
(κ) H$_2$C=CH—CONH$_2$
(λ) H$_2$C=C(CH$_3$)—CONH$_2$
(μ) Cl$_2$C=C(Cl)—CONH$_2$
(ν) HO—CH$_2$—CONH$_2$ [1]
(ξ) H$_3$C—C(Cl)=CH—CONH$_2$
(ο) H$_3$C—CH=C(Cl)—CONH$_2$
(π) HOOC—CH=C(Cl)—CONH$_2$
(ρ) HOOC—C(Cl)=CH—CONH$_2$
(σ) Ph—CH(Br)—CH(Br)—CH$_2$—CONH$_2$
(τ) Ph—CH(OH)—CONH$_2$
(υ) CH$_2$=CH—CH$_2$—CONH$_2$
(φ) CH$_3$—CH=CH—CONH$_2$
(χ) CH$_3$—CH=C(CH$_3$)—CONH$_2$
(ψ) CH$_2$=C(CH$_3$)—CH$_2$—CONH$_2$
(ω) Br—CH$_2$—CH(Br)—CONH$_2$

[1] In the sulphonation, the hydroxyl group is sulphated.

EXAMPLE 2

(I)(a)(1) A mixture consisting of 19.3 g. of 1-(N-acetyl-N-isopropyl-amino)-4-bromoanthraquinone and 16.2 g. of 1-phenyl-3-aminobutane is stirred for 20 hours at a temperature of 110°. The red melt obtained is then poured into a mixture of 200 g. of ice and 200 ml. of 2 N HCl whereupon the compound of the formula:

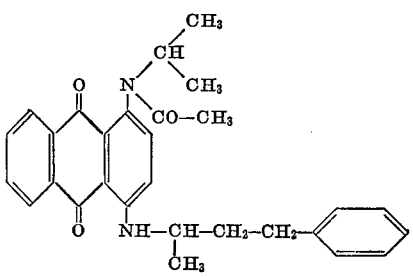

precipitates as a red resin. The aqueous hydrochloric acid phase is decanted and the product of the above formula is dissolved in 100 ml. of 80% sulphuric acid. This solution is stirred for 8 hours at a temperature of 50° and then poured onto ice whereupon the unsulfonated dyestuff of the formula:

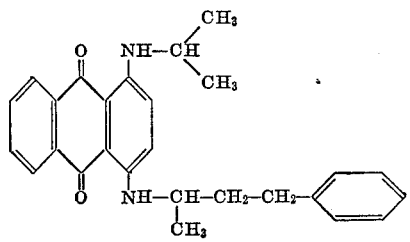

precipitates. It is separated by suction filtration and then purified by recrystallization from n-butanol.

If with otherwise the same procedure, there is used, instead of 1-(N-acetyl-N-isopropylamino)-4-bromoanthraquinone, an equivalent amount of each of the 1-(N-acetyl-N-sec-alkylamino)-4-halogeno-anthraquinones, respectively, given in the following Table 4 and 16.2 g. of 1-phenyl-3-aminobutane or an equivalent amount of each of the aralkylamines (2) to (46), respectively, which aralkylamines are listed in the above Table 2, then similar valuable dyestuffs are obtained.

TABLE 4

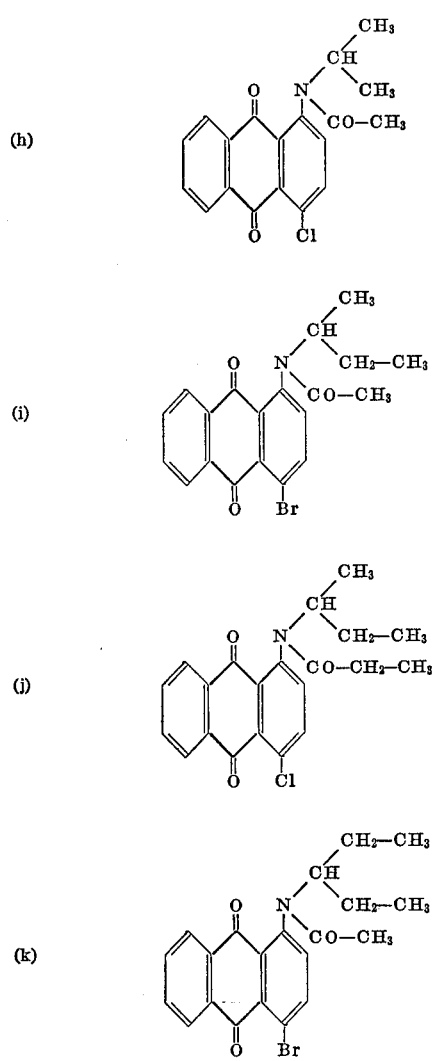

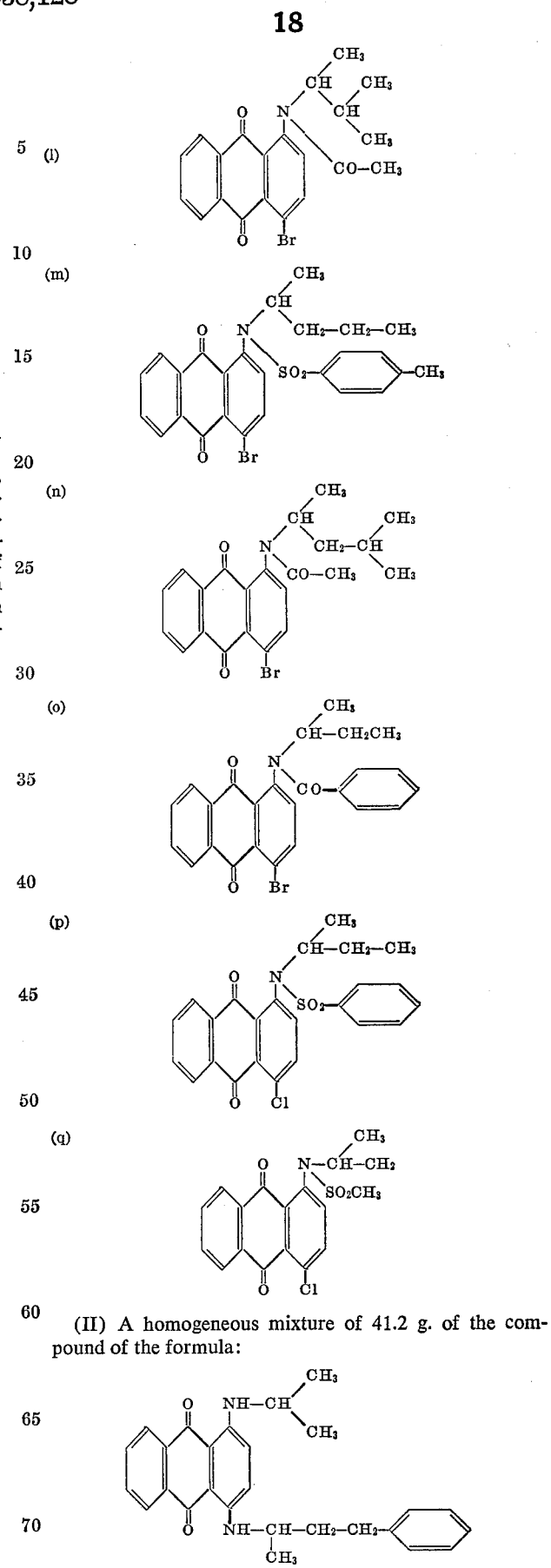

(II) A homogeneous mixture of 41.2 g. of the compound of the formula:

and 13.7 g. of N-methylol chloracetamide is added to 300 g. of 96% sulfuric acid at 0–5° and the solution obtained is stirred for 24 hours at this temperature. The temperature is then raised to 23° and 130 g. of 66% oleum are added gradually. The solution is stirred for another 6 hours at 23–25° and then poured onto ice. The product is worked up analogously to the procedure described in Example 1(II).

A dyestuff is obtained which dyes nylon and wool from a neutral to weakly acid bath in very brilliant blue shades. The dyeings are very level, have good fastness to light and, at the same time, excellent wet fastness properties.

If with otherwise the same procedure, instead of the compound of the above formula, an equivalent amount of each of the compounds obtained by condensation of the 1 - (N - acetyl - N - sec. alkylamino) - 4 - halogeno-anthraquinones listed in Table 4 with 1-phenyl-3-amino-butane or the aralkylamines listed in Table 2 is used, then dyestuffs having similar properties are obtained.

Dyestuffs with similar properties are also obtained if, with the procedure given above, the N-methylol compound of each of the amides (α) to (ω), respectively, given in Table 3 is used instead of N-methylol chloracetamide.

EXAMPLE 3

13.7 g. of α-chloracrylonitrile and 0.1 g. of hydroquinone are dissolved in 65 g. of 93% sulphuric acid at 20°, this solution is stirred for 3 hours at a temperature of 33–35°, cooled to 10–12°, 7.5 g. of α,α'-dichloro-dimethyl ether are added dropwise within 1 hour and the mixture is stirred first for 3 hours at 10–12° and then for 4 hours at 13–15°.

350 g. of 90% sulphuric acid are then added to this solution after which 41 g. of the compound of the formula:

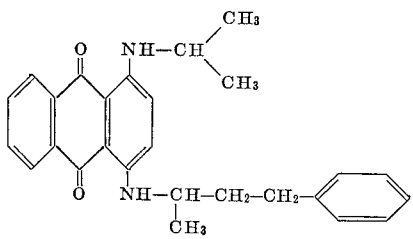

are added at a temperature of 5–10°. The mixture is stirred for 24 hours at this temperature, then poured onto ice and the condensation product is filtered off, washed neutral with water and then dried in vacuo at 60°. It is sulphonated in 6% oleum for 6 hours at 23–25° as described in Example 1. The dyestuff so obtained dyes nylon and wool from a weakly acid to neutral bath in level, brilliant blue shades; the dyeings have good light fastness and good wet fastness properties, especially good wash fastness.

If instead of the compound of the above formula, an equivalent amount of each of the compounds obtained, respectively, by reacting each of the 4-halogeno-anthraquinones (a) to (q) listed in Tables 1 and 4 with 1-phenyl-3-aminobutane or each of the phenylalkylamines (1) to (46), respectively, listed in Table 2 is used with otherwise the same procedure, then dyestuffs having similar valuable properties are obtained.

Dyestuffs having similar properties are also obtained if, with otherwise the same procedure, instead of α-chloro-acrylonitrile, an equivalent amount of each of the nitriles, respectively, given in the following Table 5 or the corresponding carboxylic acid amines are used.

TABLE 5

(i)  $Cl-CH_2-CN$ (ii) $Br-CH_2-CN$ (iii) $Cl-CH_2-CH_2-CN$ (iv) $Cl-CH_2-CH-CN$
          $|$
          $Cl$ (v) $Cl-CH=CH-CN$ (vi) $H_3C-C=CH-CN$
        $|$
        $Cl$ (vii) $H_3C-CH=C-CN$
              $|$
              $Cl$ (viii) $\begin{array}{c} Cl \\ \diagdown \\ C=C-CN \\ \diagup \quad | \\ Cl \quad Cl \end{array}$ (ix) $H_3C-O-CH_2-CH_2-CN$ (x) $\langle\phantom{O}\rangle-O-CH_2-CH_2-CN$ (xi) $\langle\phantom{O}\rangle-S-CH_2-CH_2-CN$ (xii) $HOOC-CH_2-S-CH_2-CH_2-CN$ (xiii) $\langle\phantom{O}\rangle-SO_2-CH_2-CH_2CN$ (xiv) $[\langle\phantom{O}\rangle\overset{\oplus}{N}-CH_2-CH_2-CN]Cl^{\ominus}$ (xv) $HO-CH_2-CH-CN^1$
              $|$
              $Cl$ (xvi) $HO-CH_2-CH_2-CN^1$

[1] In the sulphonation, the hydroxy groups are sulphated.

EXAMPLE 4

A mixture of 12 g. of 1-(N-sec. butylamino)-4-hydroxy-anthraquinone (obtained by reacting sec. butylamine with leuco-1,4-dihydroxy-anthraquinone), 18 g. of 1-phenyl-3-aminobutane, 40 g. of phenol and 9 g. of zinc dust is stirred for 18 hours at a temperature of 90°. 2 N-hydrochloric acid is then added to the reaction mixture until the reaction is strongly acid and the phenol is removed by steam distillation. The precipitated reaction product is filtered off and washed first with 2 N hydrochloric acid and then with water and dried whereupon a blue powder is obtained. By chromatography on an alumina column followed by recrystallization from butanol, the pure product of the formula

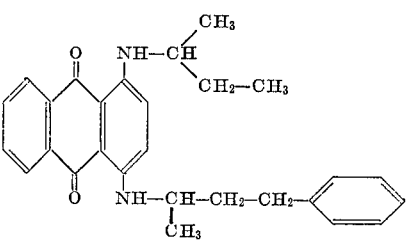

is obtained, M.P. 104°.

If instead of the 1-(N-sec. butylamino)-4-hydroxy-anthraquinone, the equivalent amount of 1-(N-sec. butylamino)-4-amino-anthraquinone [obtained from 1-(N-sec. butylamino)-4-nitro-anthraquinone by reduction] is used, then with otherwise the same procedure, the anthraquinone compound of the above formula is also obtained.

A homogeneous mixture of 42.6 g. of this anthraquinone compound and 13.7 g. of N-methylol chloroacetamide is added to 450 g. of 90% sulphuric acid at a temperature of 5–10° and the solution obtained is stirred for 24 hours at this temperature whereupon the mixture is poured onto ice. Further work up of the product and sulfonation are performed as described in Example 1. The blue dyeings attained on wool and nylon with this dyestuff are very level and have good light and wet fastness properties.

EXAMPLE 5

A mixture of 30 g. of 1-(N-isopropylamino)-4-methoxy-anthraquinone (obtained by methylation of 1-(N-isopropylamino)-4-hydroxy-anthraquinone) and 50 g. of 1-phenyl-2-methyl-3-aminobutane is stirred for 24 hours at a temperature of 150°. After cooling, the mixture is diluted with 250 ml. of methanol, the precipitated product is filtered off and washed with methanol and recrystallised from n-butanol. The compound of the formula:

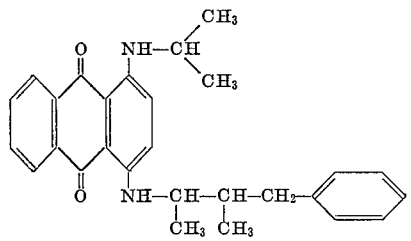

is obtained.

If with otherwise the same procedure, instead of 1-(N-isopropylamino)-4-methoxy-anthraquinone, an equivalent amount of 1-(N-isopropylamino)-4-nitro-anthraquinone (obtained by reaction of 1-methoxy-4-nitro-anthraquinone with isopropylamine) is used then the anthraquinone compound of the above formula is obtained.

42.6 g. of this anthraquinone compound of the above formular are added to 90% sulfuric acid and condensed therein at 5–10° with 13.7 g. of N-methylol chloroacetamide by the procedure described in Example 1(II) and the condensation product is sulfonated at 25° in 6% oleum for 18 hours. The dyestuff so obtained dyes nylon and wool from a weakly acid to neutral bath in brilliant blue shades. The dyeings have good wet and light fastness.

EXAMPLE 6

(I) A mixture consisting of 39 g. of the compound of the formula:

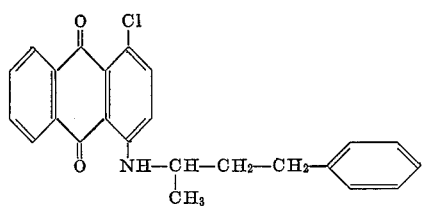

(obtained by reacting 1-chloro-4-methoxy-anthraquinone with 1-phenyl-3-aminobutane), 30 g. of 3-aminopentane, 10 g. of technical anhydrous potassium acetate, 0.010 g. of cuprous chloride, 0.30 ml. of water and 50 ml. of n-butanol is stirred in an autoclave for 48 hours at a temperature of 120°. After cooling, 200 ml. of methanol are slowly poured into the mixture while stirring whereupon the product formed precipitates. This is filtered off, washed with methanol, then with hot 2 N hydrochloric acid, and finally with water, and dried. On recrystallising from n-butanol, the compound of the formula:

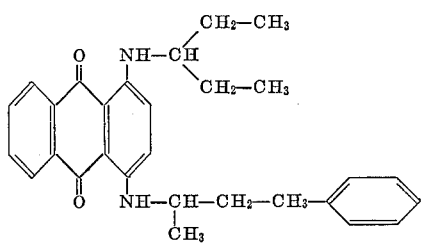

is obtained.

(II) 44 g. of this anthraquinone compound is condensed as described in Example 1 with 13.7 g. of N-methylol chloroacetamide in 90% sulfuric acid, and then sulfonated at 25° in 6% oleum for 18 hours. The blue dyeings obtained with this dyestuff on nylon and wool have good wet and light fastness.

If in step (I), instead of the 1-chloro-4-aralkylamino-anthraquinone compound there mentioned, an equivalent amount of the corresponding 1-bromo-anthraquinone is used, then, with otherwise the same procedure, the same end product is obtained.

EXAMPLE 7

(I) A mixture of 54 g. of the compound of the formula:

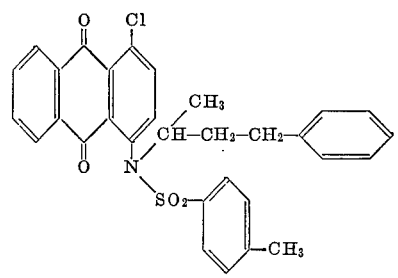

(obtained by reacting the corresponding 1-chloro-4-aralkylamino-anthraquinone compound with p-toluene sulphochloride), 30 g. of 2-amino-3-methylbutane and 100 ml. of n-butanol is stirred in an autoclave for 24 hours at a temperature of 110° whereupon the reaction mixture is steam-distilled. The residue, a red resin, is added to 600 g. of 80% sulphuric acid and the solution is stirred for 10 hours at a temperature of 60° whereby the tosyl radical is split off. The solution is poured onto ice, the precipitated product is filtered off and then crystallised from n-butanol. The unsulfonated dyestuff obtained has the formula:

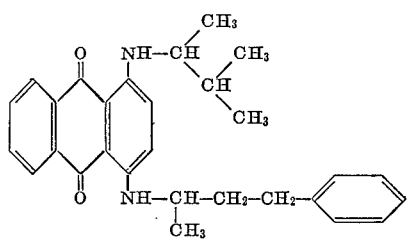

If, with otherwise the same procedure, instead of the above 1-chloro-4-(N-aralkyl - N - p-tolylsulfonylamino)-anthraquinone compound, an equivalent amount of each of the 1-halogeno-4-(N-acyl - N - aralkylamino)-anthraquinones, respectively, given in the following Table 6 with 30 g. of 2-amino-3-methylbutane is used, then the 1-sec. alkylamino-4-aralkylamino-anthraquinone of the above formula is also obtained.

TABLE 6

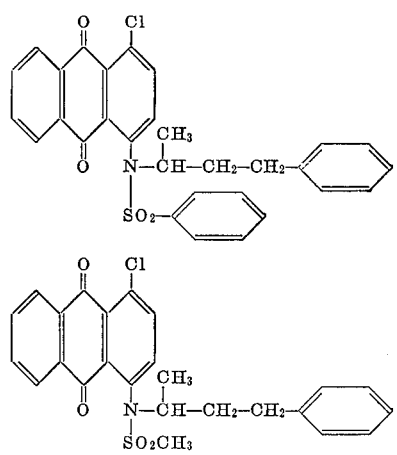

TABLE 6—Continued

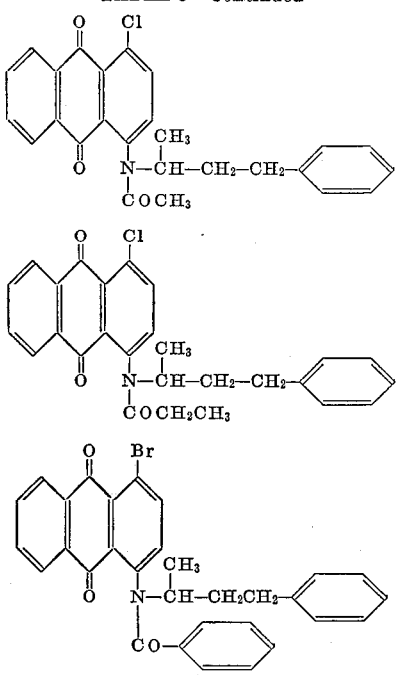

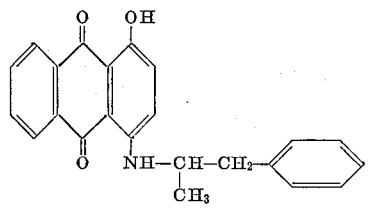

(II) 44 g. of the unsulfonated dyestuff of the above given formula obtained under (I) in this example are condensed as described in Example 1(II) with 13.7 g. of N-methylol-chloracetamide and the condensation product is then sulfonated at 25° with 6% of oleum. The dyestuff thus obtained has valuable properties similar to those described in Example 1.

EXAMPLE 8

A mixture of 14.5 g. of the compound of formula:

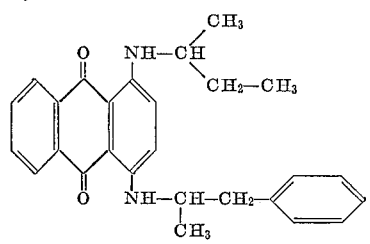

(obtained by reacting leuco-1,4-dihydroxy-anthraquinone with 1-phenyl-2-aminopropane), 20 g. of sec. butylamine, 40 g. of phenol and 9 g. of zinc dust is stirred for 18 hours in an autoclave at a temperature of 100°. The reaction mixture is transferred into a stirring flask, 300 ml. of ethanol and 50 ml. of 30% sodium hydroxide solution are added and the whole is stirred under reflux while simultaneously introducing a stream of air until no more leuco compounds can be detected. The precipitate obtained is filtered off, washed with methanol and then with water, and dried. By chromatography on an alumina column followed by recrystallization from butanol, the unsulfonated dyestuff of the formula:

is obtained.

If, instead of the 1-hydroxy-anthraquinone compound of the first formula given above, an equivalent amount of the corresponding 1-amino-anthraquinone compound is used, then, with otherwise the same procedure, the anthraquinone compound of the above formula is also obtained.

41 g. of the unsulfonated dyestuff of the above formula are added to 90% sulfuric acid and condensed therein with 13.7 g. of N-methylol chloracetamide as described in Example 1 and then sulfonated in 6% of oleum at 25° for 15 hours. The monosulfonated dyestuff so obtained dyes nylon and wool from a weakly acid to neutral bath in brilliant blue shades. The dyeings have good wet and light fastness.

EXAMPLE 9

A mixture of 37 g. of the compound of the formula:

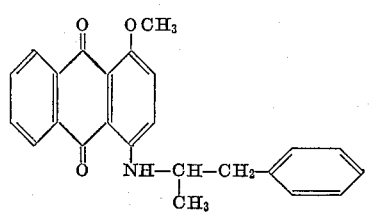

(obtained by methylating the corresponding 1-hydroxy-anthraquinone compound), 40 g. of sec. butylamine and 100 ml. of n-butanol is stirred for 24 hours in an autoclave at 150°. At a temperature of 60°, 100 ml. of methanol are slowly poured into the mixture whereupon a precipitate is formed. After cooling the reaction mixture, the precipitate is filtered off and recrystallized from n-butanol. The product is identical with the unsulfonated dyestuff described in Example 8 and is further reacted as there described.

If in the above Example 9, instead of the 1-methoxy-anthraquinone compound of the above formula, an equivalent amount of the corresponding 1-nitro-anthraquinone compound (obtained by reaction of 1-nitro-4-methoxy-anthraquinone with 1-phenyl-2-amino-propane) is used and otherwise the procedure described in Example 9 is followed, then the same dyestuff is obtained.

EXAMPLE 10

A mixture of 16 g. of 1,4-dihydroxy-anthraquinone, 8 g. of leuco-1,4-dihydroxy-anthraquinone, 16 g. of 1-phenyl-3-aminobutane and 50 ml. of sec. butanol is stirred for 18 hours at a temperature of 50 to 55°. Without isolating the corresponding 1-hydroxy-4-aralkylamino-anthraquinone so obtained, 25 g. of isopropylamine are added to the mixture and the whole is stirred in an autoclave for 20 hours at a temperature of 100°. The reaction mixture is transferred to a stirring flask, 250 ml. of methanol added thereto, and the mixture is stirred under reflux while simultaneously introducing a stream of air until no more leuco compound can be detected. After cooling, the precipitated reaction product is filtered off and washed with methanol after which it is recrystallized from n-butanol. This product is identical with the unsulfonated dyestuff of Example 2 and is further reacted as there described.

If the mixture first given above of 1,4-dihydroxy-anthraquinone and leuco-1,4-dihydroxy-anthraquinone is reacted in a first step with the isopropylamine and in a second step with 1-phenyl-3-aminobutane, then with otherwise analogous procedure, the same unsulfonated dyestuff is obtained.

EXAMPLE 11

10 g. of wool flannel are introduced into a 40° warm dyebath consisting of 400 ml. of water, 0.30 g. of ammonium sulphate and 0.20 g. of the dyestuff of the formula:

[Structure: 1,4-diaminoanthraquinone with 1-NH-CH(CH$_3$)$_2$ (isopropyl) and 4-NH-CH(CH$_3$)-CH$_2$-CH$_2$-phenyl substituted with CH$_2$-NH-CO-CH$_2$Cl and SO$_3$H]

obtained according to Example 2. The temperature is gradually raised to the boil within 30 minutes whereupon dyeing is performed for 1 hour at the boil. The goods are then rinsed and finished in the usual way. A very level, brilliant blue dyeing is obtained which is distinguished by excellent fastness to light and wet fastness properties.

EXAMPLE 12

10 g. of nylon 66 fabric are introduced into a 40° warm dyebath which contains 0.20 g. of the dyestuff according to Example 11, 0.25 g. of the sodium salt of the acid sulfuric acid ester of butyl ricinoleate and 0.25 g. of ammonium sulfate in 500 ml. of water. The temperature of the bath is raised gradually to the boil within 30 minutes whereupon dyeing is performed for 1 hour at a light boil. The goods are then rinsed and dried. A very level, brilliant blue dyeing is obtained which has very good fastness to light and good fastness to washing.

EXAMPLE 13

100 g. of a fabric of texturized nylon 66 (Banlon type) is introduced at 40° into a dyebath containing in 4000 ml. of water 3 g. of the dyestuff of the formula:

[Structure: 1,4-diaminoanthraquinone with 1-NH-CH(CH$_3$)$_2$ and 4-NH-CH(CH$_3$)-CH$_2$-CH$_2$-phenyl substituted with CH$_2$-NHOC-CH$_2$Cl]

ground to an average particle size of about 2–5 microns, as well as 4 g. of oleic acid-N-methyl-tauride.

The temperature of the bath is raised evenly within about 30 minutes to the boil, and boiling is continued during another 60 minutes. The fabric is then thoroughly rinsed first in warm and then in cold water and dried. A brilliant blue dyeing of good fastness to water, to washing, to perspiration and to light is obtained.

We claim:

1. A dyestuff of the formula:

[Structure: anthraquinone with O, HN-Q' at position 1, O and NH-CH(R$_3$')-R$_5$-phenyl(Z$_1$,Z$_2$) with SO$_3$H and CH$_2$-NH-CO-A$_1$ substituents]

wherein:

Q' represents one of the radicals $$-C\overset{R_1}{\underset{R_2}{H}}$$

cyclopentyl or cyclohexyl,
each of R$_1$ and R$_2$ represents lower alkyl,
R$_3$' represents alkyl of from 1 to 2 carbon atoms,
R$_5$ represents alkylene of from 1 to 2 carbon atoms,
Z$_1$ represents hydrogen, methyl, methoxy, chlorine or bromine,
Z$_2$ represents hydrogen, methyl or methoxy, and
A$_1$ represents lower alkyl of from 1 to 4 carbon atoms or lower alkenyl of 2 to 3 carbon atoms, each of which is substituted by from one to two halogen atoms selected from chlorine and bromine.

2. A dyestuff as defined in claim 1, wherein A$_1$ represents —CCl=CH$_2$ or —CH$_2$Cl.

3. A dyestuff as defined in claim 1, wherein A$_1$ represents $$-\overset{}{\underset{Hal}{C}}H-CH_2-Hal$$

wherein Hal represents chlorine or bromine.

4. A dyestuff as defined in claim 1 wherein Q' represents $$-C\overset{R_1}{\underset{R_2}{H}}$$

wherein each of R$_1$ and R$_2$ is methyl, R$_3$' is methyl, R$_5$ is —CH$_2$—CH$_2$—, each of Z$_1$ and Z$_2$ is hydrogen and A$_1$ is —CH$_2$Cl.

5. A dyestuff as defined in claim 1 wherein Q' represents $$-C\overset{R_1}{\underset{R_2}{H}}$$

wherein each of R$_1$ and R$_2$ is methyl, R$_3$' is methyl, R$_5$ is —CH$_2$—CH$_2$—, each of Z$_1$ and Z$_2$ is hydrogen and A$_1$ is —CCl=CH$_2$.

6. A dyestuff of the formula:

[Structure: anthraquinone with O, HN-Q' at position 1, O and NH-CH(R$_3$')-R$_5$-phenyl(Z$_1$,Z$_2$) with SO$_3$H and CH$_2$-NH-CO-A$_1$' substituents]

wherein:

Q' represents one of the radicals $$-C\overset{R_1}{\underset{R_2}{H}}$$

cyclopentyl or cyclohexyl,
each of R$_1$ and R$_2$ represents lower alkyl,
R$_3$' represents alkyl of from 1 to 2 carbon atoms,
R$_5$ represents alkylene of from 1 to 2 carbon atoms,
Z$_1$ represents hydrogen, methyl, methoxy, chlorine or bromine,
A$_1$' represents alkenyl of from 2 to 4 carbon atoms.

7. A dyestuff as defined in claim 6, wherein Q' represents $$-C\overset{R_1}{\underset{R_2}{H}}$$

wherein each of R$_1$ and R$_2$ is methyl, R$_3$' is methyl, R$_5$ is —CH$_2$—CH$_2$—, each of Z$_1$ and Z$_2$ is hydrogen and A$_1$' is —CH=CH$_2$.

8. A dyestuff as defined in claim 6, wherein Q' represents
wherein each of $R_1$ and $R$ is methyl, $R_5'$ is methyl, $R_5$ is —$CH_2$—$CH_2$—, each of $Z_1$ and $Z_2$ is hydrogen and $A_r'$ is
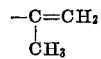
References Cited
UNITED STATES PATENTS
| | | | |
|---|---|---|---|
| 2,426,547 | 8/1947 | Buckley et al. | 260—371 |
| 2,475,530 | 7/1949 | Tatum | 260—371 |
LORRAINE A. WEINBERGER, Primary Examiner
E. J. SKELLY, Assistant Examiner
U.S. Cl. X.R.
8—26, 39, 40